United States Patent [19]

Logan et al.

[11] Patent Number: 5,284,229

[45] Date of Patent: Feb. 8, 1994

[54] APPARATUS AND METHOD FOR SELECTIVELY GRIPPING AND ROTATING A PART

[75] Inventors: Russell J. Logan, Pepper Pike; Keith K. Logan; P. Clark Hungerford, both of Cleveland Heights, all of Ohio

[73] Assignee: Federal Process Company, Cleveland, Ohio

[21] Appl. No.: 791,361

[22] Filed: Nov. 14, 1991

[51] Int. Cl.⁵ .................. B05C 11/02; B05C 13/00; B23Q 3/14

[52] U.S. Cl. .................. 118/107; 118/232; 118/503; 269/48.1

[58] Field of Search .......... 118/503, 107, 232; 269/48.1

[56] References Cited

U.S. PATENT DOCUMENTS 3,945,486  3/1976  Cooper ........................ 118/503
3,951,101  4/1976  Karakawa et al. ............. 118/503
4,314,524  2/1982  Deguchi ....................... 118/503
4,927,205  5/1990  Bowler et al. ................. 118/503

Primary Examiner—W. Gary Jones
Assistant Examiner—Steven P. Griffin
Attorney, Agent, or Firm—Calfee, Halter & Griswold

[57] ABSTRACT

An apparatus for selectively gripping and rotating a part includes a selectively rotatable drive shaft assembly, a draw bar assembly and an expandable media positioned therebetween. Axial movement of the draw bar assembly relative to the drive shaft assembly selectively compresses the expandable media to radially expand the same for gripping the part and for coupling the draw bar assembly to the drive shaft assembly, thereby permitting the gripped part to be rotated. The apparatus preferably includes an adjustable metering valve to apply sealant to horizontally oriented threads on the part and further includes a wiper to distribute sealant along the threads and to uniformly spread the remaining sealant into the thread grooves.

17 Claims, 4 Drawing Sheets

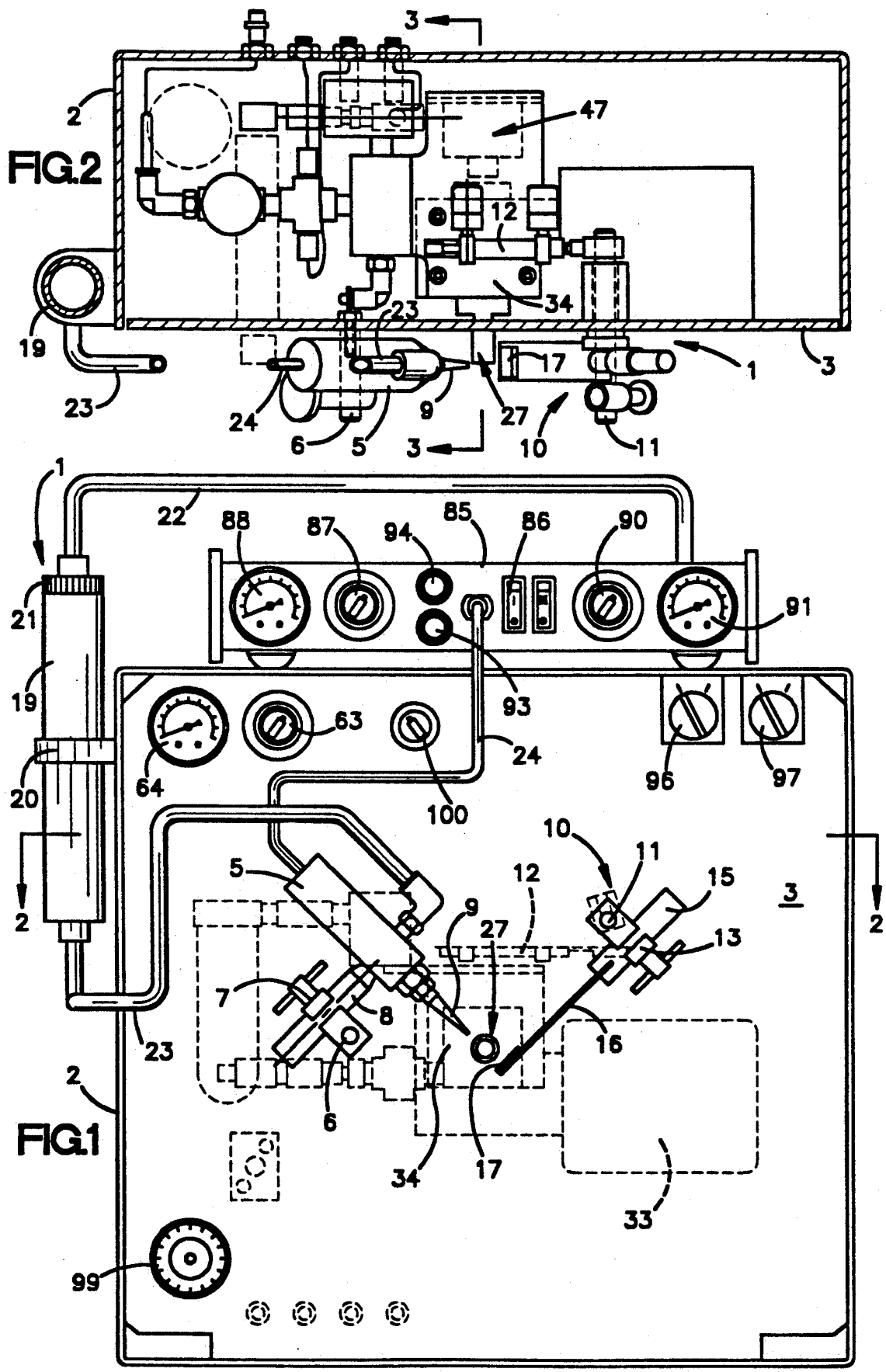

APPARATUS AND METHOD FOR SELECTIVELY GRIPPING AND ROTATING A PART

FIELD OF THE INVENTION

The present invention relates generally to an apparatus for gripping and selectively rotating a part and relates specifically to an apparatus for applying a liquid, latex-based sealant to the threads of the part.

BACKGROUND OF THE INVENTION

Many threaded parts and fittings are used in applications requiring a tight seal to be obtained between the threads of the part or fitting and the threads of the system piping. At least two different techniques have been developed for applying sealant to the threads of the fitting.

First, a TEFLON-type sealant tape may be applied to the threads of the fitting. The sealant tape can either be applied by hand, semi-automatically or automatically to a part rotating upon a spindle or mandrel. The tape application is relatively time consuming and may not always be as uniform as preferred. Pieces of the tape may also get into the system to detrimentally affect its performance. A fitting having a sealant tape applied to its threads normally cannot be reused without applying new sealant tape. For example, in a building having an automatic sprinkling system, if the sprinkling head fitting is removed for maintenance purposes, it would normally have the old sealant tape removed from and new sealant tape applied to its threads prior to being reassembled in the system.

The second main sealant application technique for threads of fittings uses paste or liquid type sealants. The paste type sealant is normally hand applied. The liquid type sealant can be dispensed onto a product mounted on a rotating spindle. The liquid sealant when applied to the threads of a vertically oriented fitting, tends to drip lessening the probability of uniform sealant application to the threads. The liquid sealant may also drip into the part fixture and drive mechanism potentially causing maintenance and/or operational problems.

In any type sealant application, it is necessary to seal the threads of numerous fittings having different shapes, thread positions and thread lengths. The hand, semi-automatic or automatic processes presently known for sealing the threads of these various fittings are difficult to adapt from one fitting to another and are relatively time consuming in both process set up and process implementation.

SUMMARY OF THE INVENTION

The principle object of the present invention is to uniformly apply a liquid sealant to horizontally oriented threads of a rotating part. By horizontally orienting the threads, the tendency of the latex-base sealant material to drip is minimized and the uniformity of sealant application is improved.

It is yet another object of the present invention to provide an apparatus for gripping and selectively rotating a part that is readily adaptable to the shape of the part and further readily adaptable to the position and length of the thread. For this purpose, the apparatus includes a drive shaft assembly, a draw bar assembly and an expandable media positioned therebetween. The expandable media, such as a plurality of O-rings or a plastic tube, is selectively compressed for radial expansion in either direction to hold the fitting thereon and to rotatably couple the draw bar assembly to the drive shaft assembly for selective rotation of the gripped part. The draw bar assembly is adapted for use with a plurality of readily changeable expanders and stop collars to accommodate different parts of varying configurations and size and to make use of either inner or outer diameter gripping. The pressure applied in compressing the expandable media may also be adjusted as required for holding tapered surfaces or different part configurations.

It is still another object of the present invention to provide a sealant applicator apparatus having a relatively simple construction, which is easily set up and operated. The housing for the sealant applicator apparatus includes a pivotal front door, which mounts the main structural components of the applicator system. The metering valve and wiper are positioned on the outside surface of the pivotal front door. The motor, gear box and piston cylinder assemblies are mounted on the inside surface of the door. By so locating the components, cleanup is easy should sealant be inadvertently spilled because the door protects the drive and control components from the spillage. A pneumatic timer may be used to provide the operational sequences needed for applying the sealant.

The invention, then, comprises the features hereinafter fully described and particularly pointed out in the claims, the following description and annexed drawings setting forth in detail certain illustrative embodiments of the invention, these being indicative, however, of but a few of the various ways in which the principles of the invention may be embodied.

DETAILED DESCRIPTION OF THE DRAWINGS

In the drawings:

FIG. 1 is a front view of the sealant applicator of the present invention;

FIG. 2 is a horizontal sectional plan view taken generally along the plane 2—2 of FIG. 1, showing the mounting of the major components of the system to the outer and inner surfaces of the pivotal front door for the housing;

Figure 3:
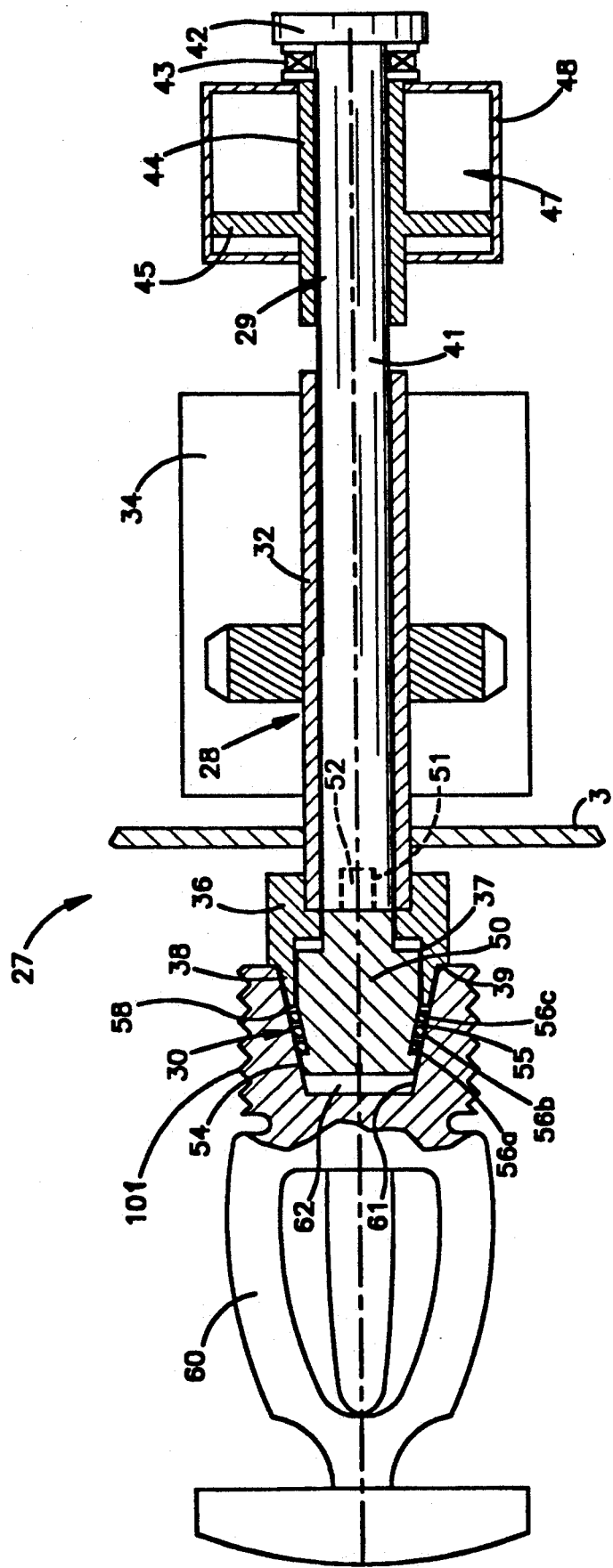
FIG. 3 is a schematic side elevation partially in section, taken generally along the plane 3—3 in FIG. 2, illustrating a sprinkler head fitting partially positioned around the expander of the draw bar assembly and the stop collar of the drive shaft assembly, before radial expansion of the expandable media.
Figure 3A:
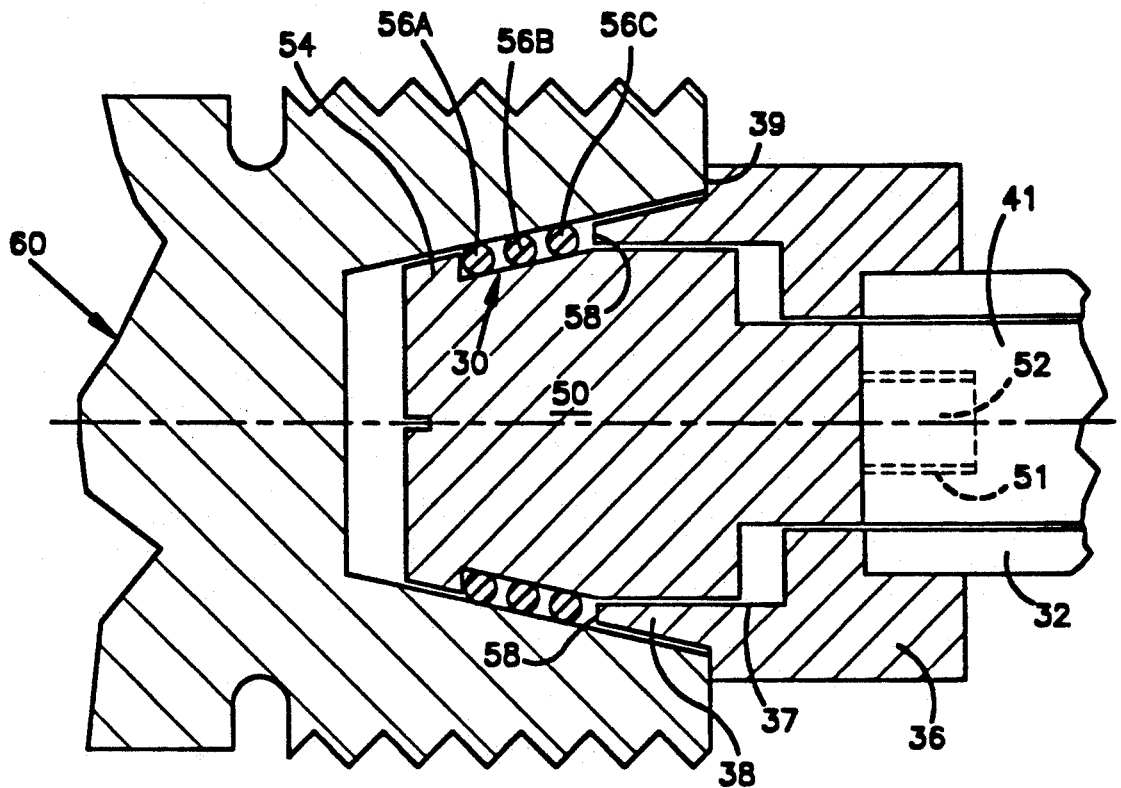
FIG. 3A is an enlarged sectional elevation of the mandrel, stop collar and expandable media of FIG. 3, showing in more detail the uncompressed and unexpanded position of the expandable media when the draw bar assembly is in its first axial position.
Figure 4A:
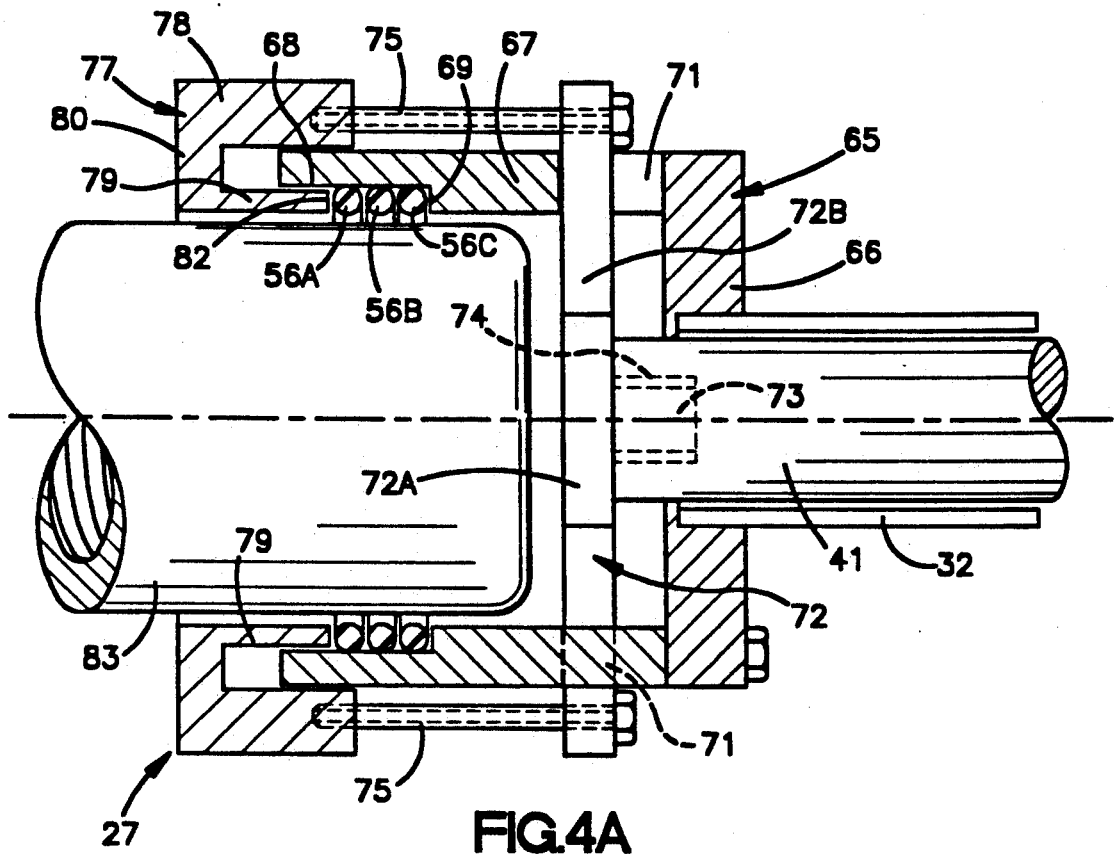
Figure 4B:
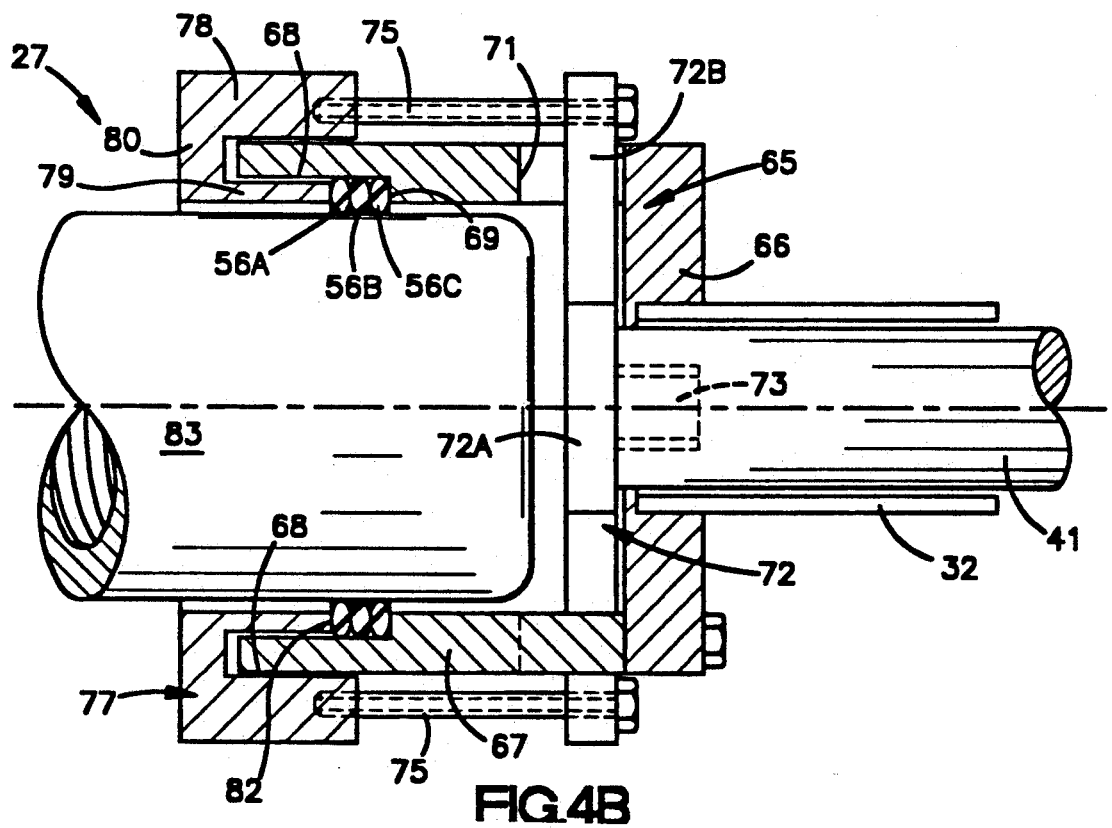

FIG. 4A is an enlarged vertical section similar to FIG. 3A showing a different expander on the draw bar assembly and a different stop cup on the drive shaft assembly, with the expandable media being shown as uncompressed in the first position of the draw bar assembly; and FIG. 4B is a vertical cross section similar to FIG. 4A but showing the draw bar assembly in its second axial position to compress the three O-rings forming the expandable media radially inwardly to grip the outer diameter of the part.

DETAILED DESCRIPTION OF THE PREFERRED EMBODIMENT

Turning now in more detail to the drawings and initially to FIG. 1, the sealant applicator apparatus, indicated generally at 1, includes a housing 2. The housing 2 includes a hinged front door 3 pivotally connected to the housing along the bottom wall thereof. The front door 3 supports the major components of the sealant application apparatus.

A metering valve 5 is adjustably connected to the outer or exposed surface of hinged door 3. A fixed pivot rod 6 extending outwardly from the front surface of door 3 has a first clamp 7 connected thereto. The clamp 7 receives a mounting post 8 secured to and depending downwardly from metering valve 5. The clamp 7 permits selective axial adjustment of the mounting post 8 relative to the clamp 7, permits selective pivotal movement of the clamp relative to fixed rod 6 and also permits selective adjustment of the clamp along the length of the fixed pivot rod 6. The metering valve 5 can thus be selectively adjusted relative to the part to allow the nozzle 9 of the metering valve to be properly positioned relative to the threaded section of the part being treated.

A wiper assembly, indicated generally at 10, is also mounted on the front door 3. The wiper assembly 10 includes a pivotal shaft 11 extending through the door 3. A piston cylinder assembly 12 mounted to the inside surface of door 3 pivots the shaft 11 through a defined reciprocal arc. The rotatable shaft 11 has a second clamp 13 mounted thereon on the outside surface of hinged door 3. An adjustment rod 15 is adjustably mounted on and extends through second clamp 13. A wiping blade 16 is mounted to and extends downwardly from the adjustment bar 15. The second clamp 13 allows the wiping assembly 10 to be angularly adjusted relative to rotatable shaft 11, allows the adjustment bar 15 to be axially adjusted relative to the second clamp 13 and allows the second clamp to be selectively adjusted along the length of pivotal shaft 11. When the proper position of the wiping assembly 10 has been selected and secured for the part being processed, the wiping blade 16 is pivotally swung toward and away from the part by piston cylinder assembly 12 reciprocally rotating shaft 11. The distal end of wiping blade 16 has a VELCRO pad 17 mounted thereon to assist in uniformly spreading the sealant material on the threads being coated. A soft roller may also be used in place of the VELCRO pad. The VELCRO pad or roller may be replaced from time to time as needed.

To supply the sealant material, which is preferably a latex based liquid, a reservoir 19 is mounted on the sidewall of housing 2 by a bracket 20. The reservoir 19 has a removable top 21. The reservoir 19 is filled through its removable top with the sealant material before initiating the cycle of the applicator apparatus.

A pressurized air line 22 is coupled to the removable top or head of the reservoir 19 to provide pressure against the sealant in the reservoir. When pressurized air is supplied through line 22 to the head of the reservoir 19, the sealant in the reservoir is forced out the bottom of the reservoir. The sealant passes through supply line 23 extending between the reservoir and metering valve 5. The liquid sealant then enters the bore of metering valve 5.

Another source of pressurized air passes through a second air line 24 to the head end of metering valve 5. Metering valve 5 has a diaphragm (not shown) contained therein in contact with a valve spool. The diaphragm in the metering valve 5 is moved downwardly by the pressurized air to force the metering valve 5 to open. In such case, the sealant material passes through the nozzle 9 mounted on the metering valve 5 and then onto the threaded section of the part being treated.

The details of the mechanism for holding and rotating the part between the nozzle 9 of metering valve 5 and the wiping blade 16 of wiping assembly 10 is best shown in FIGS. 3 through 4. The gripping and rotating mechanism, indicated generally at 27, includes a drive shaft assembly, indicated generally at 28, a draw bar assembly, indicated generally at 29, and an expandable media, indicated generally at 30.

The drive shaft assembly 28 includes a hollow, tubular drive shaft 32 selectively rotated by motor 33 through gear box 34. The hollow drive shaft extends through and in front of door 3, as best shown in FIG. 3. The motor 33 and gear box 34 are mounted on the inner enclosed surface of door 3. The forward end of drive shaft 32 has a stop collar 36 fixedly secured thereto. The stop collar 36 includes a central blind end bore 37, a tapered nose portion 38 contoured to fit the part to be coated and an annular stop shoulder 39. The stop collar 36 cooperates with the draw bar assembly 29 to mount and grip the part being treated. The stop collar can be readily changed for different parts being processed.

The draw bar assembly 29 includes a draw bar 41 which slidably extends through and is coaxial with the hollow drive shaft 32. The rear or back end of draw bar 41 has a flange 42 thereon. A thrust washer 43 is positioned about draw bar 41 and is connected at one end to flange 42. The other side of the thrust washer is positioned against the end of the piston rod 44. The hollow piston rod 44 has an annular piston 45 secured thereto and extending radially outwardly therefrom. The piston 45 is part of the piston-cylinder assembly, indicated generally at 47, which also includes an air cylinder 48. Pressurized air is selectively supplied to either side of annular piston 45 to reciprocate the draw bar 41 between two axial positions, as required to grip or release the part being processed.

For this purpose, the forward end of the draw bar 41, which extends through and in front of hinged door 3, includes an expander 50. The expander can be readily changed as required for the part being processed. The forward end of draw bar 41 has a threaded hole 51 therein to receive and secure the threaded shank 52 on the back end of expander 50. As shown in FIG. 3, the expander 50 includes an annular front retaining lip 54 contoured to fit the part being coated. Both the stop collar and the expander are shown as being tapered only because the portion of the part being gripped is tapered. Parts with straight bores require straight expanders and stop collars.

The expandable media 30 is mounted on and extends annularly around the seat 55. The expandable media, as illustrated, includes three O-rings 56A through 56C. Although three O-rings are illustrated and described, it will be appreciated that other types of structural elements or combinations thereof could equally well be used. For example, a length of flexible tubing, such as TYGON tubing, could be used instead of the three O-rings 56A through 56C.

As best shown in FIG. 3A, the three O-rings are axially captured between the front retaining lip 54 on expander 50 and the front face 58 of stop collar 36. As shown in FIG. 3A, the O-rings 56A through 56C of the expandable media are in their normal, uncompressed state in the first axial position of the draw bar 29. In such first axial position, the draw bar 41 and expander 50 are axially advanced toward the front of the applicator apparatus.

In such position, the fitting 60 to be coated, illustrated for convenience as a sprinkler head, is slid onto the gripping and rotating mechanism 27 to position the inner diameter 61 of tapered blind end bore 62 around the expander 50, the expandable media 30 and the tapered nose portion 38 on stop collar 36. The fitting 60 is advanced until the forward end thereof abuts the annular stop face 39 on stop collar 36. The inner diameter of the blind end bore 62 of part 60 fits loosely on the expander, expandable media and stop collar to permit the user to reliably position the part by obtaining positive abutment against the stop face 39.

To grip the part 60 and to selectively couple the drive shaft assembly to the draw bar assembly, the draw bar 29 is retracted to its second axial position. For ; this purpose, pressurized air is supplied to cylinder 48 to the left side of piston head 45, while the cylinder 48 is exhausted to the right side 47 of piston 45 as viewed in FIG. 3. This will result in piston rod 44 moving to the right, as viewed in FIG. 3, to drive flange 42, pusher bar 41 and expander 50 toward the right to the second axial position thereof.

Figure 3B:
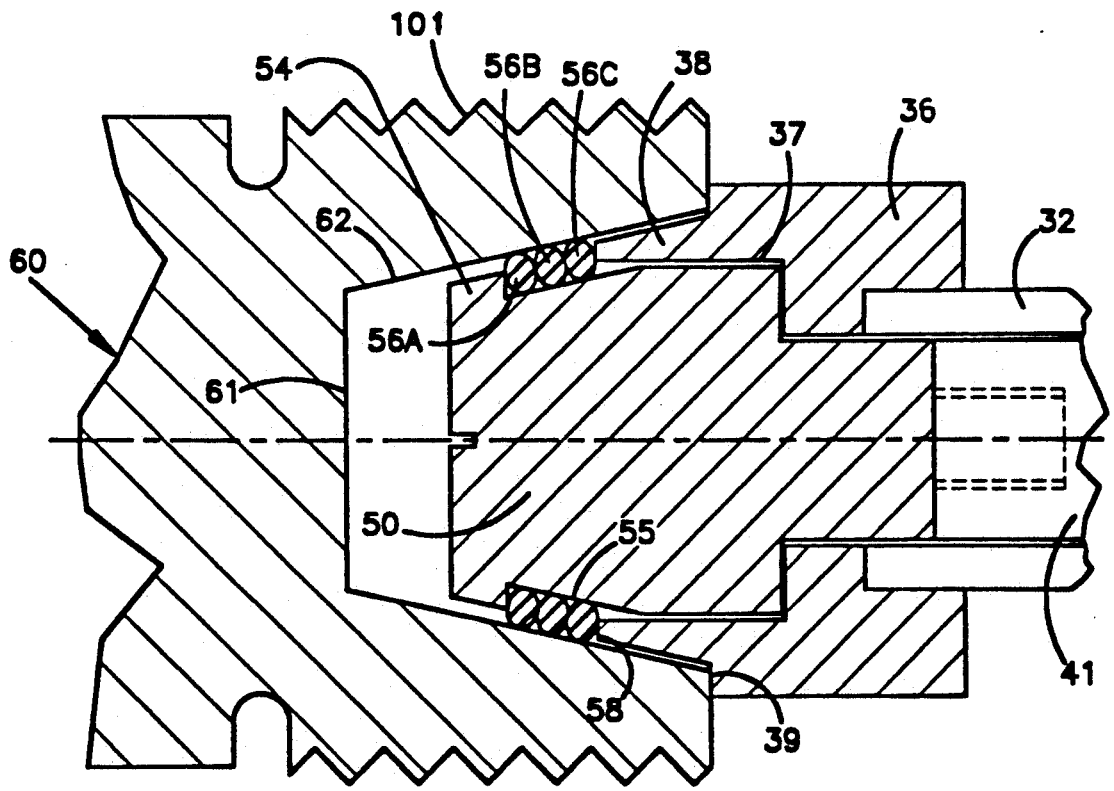
FIG. 3B is an enlarged vertical section similar to FIG. 3A except the expandable media is shown in its compressed and radially expanded position to grip the inner diameter of the sprinkler head fitting, the radial expansion of the media resulting from compression thereof caused by the draw bar assembly being moved to its second axial position.

The length of the stroke of the piston may be controlled by the axial clearance between the shoulder on the expander and the bottom of the stop collar. When the shoulder abuts the stop collar as is shown in FIG. 3B, the travel of the draw bar assembly is positively stopped. By controlling the pressure in air cylinder 48 and the magnitude of draw bar stoke, the pressure applied to and the amount of deformation in the O-rings is controlled to enhance the life and performance thereof.

As best viewed in FIG. 3B, the expander 50 and annular retaining lip 54 thereon during their axial movement have compressed O-rings 56A through 56C against the end face 58 of stop collar 36 on drive shaft assembly 28. When the O-rings are thus compressed between two confronting surfaces and the seating surface 55 precludes radially inwardly directed movement thereof, the O-rings 56A through 56C expand radially outwardly to engage and grip the inner diameter surface 61 of the blind end bore 62 in part 60.

Simultaneously, the compressed O-rings 56A through 56C are wedged between the part, the expander and the stop collar to couple the draw bar assembly to the drive shaft assembly. As such, rotary movement of the drive shaft assembly is transmitted to the draw bar assembly and the part 60 gripped by the compressed expandable media 30. The compression of the O-rings is sufficient to hold and rotate the part, but the operator can grab the part and hold it stationary, with the O-rings then acting as a slip collar to allow the drive shaft to continue to freely rotate.

The pressure acting against the annular piston 45 can be selectively adjusted and controlled. For this purpose, a draw bar pressure selection knob 63 is positioned on the upper left side of door 3 to select the pressure acting on piston 45. This pressure can be visually monitored on gauge 64, which is also positioned on door 3 adjacent selection knob 63. By controlling the pressure acting against piston 45, the force applied to the O-ring seals is also controlled for the specific part being gripped.

To remove the part after sealant has been applied, the air in cylinder 48 on the left side of piston 45 is exhausted, and pressurized air is admitted to cylinder 48 on the right side 47 of piston 45 to drive the piston to the left as viewed in FIG. 3. The draw bar 41 and expander 50 are in turn driven to the left to their respective positions shown in FIG. 3A. In such position, the O-ring 56A-56C have been axially released to return to their normal uncompressed states. The part 60, which is no longer engaged by the O-rings, can then be readily removed by axially withdrawing it from the gripping and rotating mechanism 27.

The applicator apparatus has completed its cycle and is ready for a new part to be positioned upon the gripping and rotating mechanism 27. As will be appreciated, the gripping and rotating mechanism 27 illustrated in FIGS. 3, 3A and 3B grip the part to be sealed on its internal diameter. The present applicator apparatus is equally adaptable to gripping a part on its outer diameter as illustrated in FIGS. 4A and 4B.

In such figures, the rotatable drive shaft 32 has a stop cup, indicated generally at 65, fixedly secured thereto for rotation therewith. The stop cup is like the stop collar in the first embodiment, except the sidewall is extended for accommodating the outside gripping function. The stop cup 65 includes a base plate 66 and an annular sidewall 67. A counterbore 68 is provided in the leading end of annular sidewall 67 to form an annular compression shoulder 69. The annular sidewall 67 has three equally circumferentially spaced slots 71 therein to cooperate with the draw bar.

The draw bar 41 is mounted to the compression spider 72, which has its hub 72A removably secured to the end of draw bar 41. For this purpose, a threaded shank 73 on the back of spider hub 72A is removably threadably received in a tapped hole 74 in the leading end of draw bar 41.

The spider 72 has three circumferentially spaced spokes 72B extending radially outwardly from the hub 72A. These spokes pass through and are respectively received in the three circumferentially spaced slots 71 in the annular sidewall 67 of stop cup 65. The spokes 72B of spider 72 are thus free for axial movement relative to the stop cup within and along the slots 71.

The radially outer ends of the spokes of spider 72 respectively have tie rods 75 secured thereto and extending forwardly therefrom. The forward ends of tie rods 75 are secured to a U-shaped, annular compression ring, indicated generally at 77. The compression ring 77 includes an annular connection leg 78, an annular compression leg 79 and an integral base wall 80 extending between and interconnecting the connection leg 78 with the compression leg 79.

The three compression O-rings 56A through 56C, forming the expandable media, are captured between abutment shoulder 69 on stop cup 65 and the end face 82 of compression arm 79 on compression ring 77. The O-rings 56A through 56C are received in the counterbore 68 in the sidewall 67 of stop cup 65 and are thus radially, intimately surrounded to preclude radially outwardly directed movement thereof. FIG. 4A illustrates the gripping and rotating mechanism 27 in the first axial position of the draw bar assembly 29.

A part 83 may be axially advanced into the second embodiment of the gripping and rotating mechanism 27. In such position, as illustrated in FIG. 4A, the outer diameter of part 83 is circumferentially surrounded by compression ring 77, O-rings 56A-56C and the sidewall 67 of stop cup 65. A stop may be provided on the inside diameter of sidewall 67 to properly repetitively position parts 83 sequentially being positioned within the gripping and rotating mechanism 27.

With the part 83 positioned as shown in FIG. 4A, the draw bar assembly 29 can be moved to its second axial position to compress the O-rings to grip the part on its outer diameter. As shown in FIG. 4B, when the drive bar assembly has been positioned axially to the right to its second position, the radial spokes of spider 72 have moved axially to the right within the slots 71. The tie bars 75 and compression ring 77 have also been moved to the right. The annular end face 82 on the compression arm 79 of compression ring 77 has engaged and compressed the O-rings during its axial movement toward shoulder 69 on stop cup 65. With such compression and with radially outwardly directed expansion precluded by counterbore 68, the O-rings 56A through 56C expand radially inwardly to engage and grip the outside diameter of the part 83, as shown in FIG. 4B. The O-rings being wedged between the compression ring, stop cup and part also serve to couple the drive bar assembly to the draw bar assembly to transmit rotary movement of the drive bar assembly through the draw bar assembly to the gripped part 83. However, in this embodiment, the draw bar is always rotatably coupled to the drive bar assembly because the spider spokes 72B on the draw bar assembly are respectively received in slots 72 in the sidewall 67 of socket 65.

To release the part 83 when the sealant application treatment is finished, the draw bar assembly 29 is returned to its first axial position show in FIG. 4A. In such position, the O-rings have returned to their normal uncompressed state allowing the part 83 to be withdrawn from the gripping and rotating mechanism 27.

While the operation of the applicator apparatus 1 is believed to be apparent from the above description, a brief operational sequence is set forth hereinafter for purposes of completeness and to explain some of the controller details.

A controller 85 is positioned on top of housing 2. The controller 85 includes an "on/off" power switch 86 for the applicator apparatus. A metering valve, pressure control knob 87 is provided on the controller to select the air pressure at the head of metering valve 5. A meter valve pressure gauge 88 is provided on controller 85 adjacent knob 87 to allow the meter valve pressure to be continually visually monitored by the operator.

The controller 85 also includes a reservoir pressure control knob 90 to select the pressure applied to the head end of reservoir 19. A reservoir pressure gauge 91 is provided on controller 85 adjacent reservoir pressure knob 90. The reservoir pressure gauge 91 allows the pressure applied to the head end of reservoir 19 to be monitored by the operator during the operative cycles of the apparatus.

The controller 85 has a first time control knob 93 to set a coarse time adjustment of the cycle time for the reservoir and metering valve. The controller 85 has a second time control knob 94 for fine adjustment of the cycle time for the reservoir and metering valve. First and second knobs 93 and 94 are set to provide sufficient time with the pressures being used to apply a measured shot of liquid sealant in a sufficient quantity to uniformly coat the threaded section being treated with sealant.

The upper right side of pivotal front door 3 is also provided with an "on/off" motor drive switch 96. When switch 96 is on, the motor is set to operate during the applicator cycle to selectively drive gear box 34 for rotation of hollow drive shaft 32. During operation, the motor runs continuously with the rotation of the part being controlled by whether or not the draw bar assembly is coupled to the drive shaft assembly by compression of the expandable medium therebetween. The expandable media when alternately compressed and decompressed is thus performing a drive coupling function analogous to a clutch.

A mode operation switch 97 for the metering valve is also positioned on pivotal front door 3 immediately adjacent the "on/off" motor drive switch 96. The mode operation switch 97 has three positions. In the first position, the metering valve 5 is in an automatic mode for operation in the cycle sequence of the applicator apparatus. In the second position, the metering valve 5 is disconnected from the system. In the third position of mode switch 97, the metering valve can be operated independently of the normal cycle to allow air bubbles in the sealant line to be purged, to check operation of the metering valve or to add a small amount of additional sealant to an incompletely covered thread section. This third position is spring biased to the center or second position and so only performs in this position as long as it is held.

A cycle time control knob 99 is also provided on the lower left corner of pivotal front door 3. The cycle control time is selected for the entire operational sequence and is greater than the time selected for the operation of the reservoir and metering valve. The entire cycle is initiated by the operator actuating a floor pedal (not shown).

A wiper adjust switch 100 is employed at set up to permit the part being coated to be clamped in place and the wiper cylinder 12 exhausted of air pressure so the wiper arm can move freely. By doing this, the operator is able to readily set the wiper assembly 10 at the retracted position of cylinder 12 so pad 17 properly contacts the threaded portion of the part being coated. The position of the wiper switch to allow this set up adjustment of the wiper assembly is marked "adjust". After setting the wiper, the switch 100 is moved to a position marked "auto" for operation of the applicator apparatus 1.

To initiate a cycle of the applicator apparatus 1, the main power switch 86 is in its "on" position and the motor switch 96 is in its "on" position. The draw bar pressure control knob 63 has been adjusted to the desired draw bar pressure for the part being treated. The metering valve pressure control knob 87 has been set for the sealant material being handled and the part being treated. The reservoir pressure knob 90 has also been set for the specific sealant material in the system and the part being handled. The control knobs 93 and 94 for coarse and fine tuning adjustment, respectively, of the cycle time for the reservoir and metering valve have also been set for the part being treated. The mode switch 97 may have been utilized in its second and third positions for set up and is then set in its first automatic position for permitting the metering valve to automatically work during the operational cycle. The cycle control knob 99 has been set to establish the overall cycle time for the complete operational sequence consistent with the sealant material being used and the part being treated. Finally, the wiper adjust switch 100 has been set in the auto position.

It will also be appreciated that the expander and stop collar (or cup) have been selected for the part being treated and have respectively been applied to the draw bar and drive shaft assemblies. In addition, the metering valve 5 and wiping assembly 10 have been geometrically adjusted to obtain proper positioning thereof for the part being treated.

The part being treated, for example sprinkler head 60 as shown in FIG. 3, is then manually or automatically positioned on the gripping and rotating mechanism 27, with the end thereof abutting annular shoulder 39 on stop collar 36. The operator then initiates the cycle by actuating the foot pedal.

The draw bar is initially moved from its first axial position to its second axial position to compress the expandable media 30 to grip the inner diameter of part 60 and to couple the draw bar to the drive shaft assembly for rotation.

Liquid sealant is delivered from reservoir 19 through supply line 23 to metering valve 5. The liquid, latex-based sealant is then forced from metering valve 5 through nozzle 9 for a time period established by controller 85 onto the threaded section 101 of the sprinkler head 60.

The wiper assembly 10 is pivoted into its operative position in which the VELCRO pad 17 on wiper blade 16 lightly tangentially contacts the surface of threaded section 101. The pad 17 is preferably positioned diametrically opposite nozzle 9 to keep the sealant material from inadvertently dripping off the threads 101. When sufficient sealant material has been applied to the threaded section 101, the metering valve 5 is shut off to discontinue the flow of the sealant material. The pad 17 on wiping blade 16 distributes any excess sealant applied to the threaded section 101 and uniformly spreads the distributed sealant across and within the full extent of the threaded section. When the wiping function is complete, the wiping assembly 10 is pivoted by piston cylinder assembly 12 arcuately away from the part 60 to its non-operative position radially withdrawn from the threaded section 101.

The draw bar is then returned to its first axial position in which the expandable media 30 is again in its normal or uncompressed state. The sprinkler head 60 with its threaded section 101 having the liquid sealant material uniformly applied thereto can then be automatically or manually removed from the gripping and rotating mechanism 27. The applicator apparatus is then ready to receive another untreated part for a repetition of the operational cycle just described.

It will be apparent from the foregoing that changes may be made in the details of construction and configuration without departing from the spirit of the invention as defined in the following claims. For example, the gripping and rotating mechanism 27 of the present invention may be used in any application requiring a part to be temporarily gripped and rotated. While the sealant application system described is the preferred embodiment for the gripping and rotating mechanism, the scope of the invention is not limited to that application.

What is claimed is:

1. An apparatus for gripping a gripping surface of a part and for selectively rotating such part, the gripping surface of the part having a certain size and shape, said apparatus comprising:
   a drive shaft assembly selectively rotatably driven by a motor;
   a draw bar assembly generally coaxial with and selectively axially movable relative to the drive shaft assembly; and
   an expandable media positioned between part of the drive shaft assembly and part of the draw bar assembly;
   the draw bar assembly having (i) a first axial position in which the expandable media is in an uncompressed state and (ii) a second axial position in which the expandable media is compressed between said part of the drive shaft assembly and said part of the draw bar assembly to a radially expanded state for gripping the surface of the part and for rotatably coupling the drive shaft assembly to the draw bar assembly to selectively rotatably drive the gripped part when the motor is operated.

2. The apparatus of claim 1 wherein a retainer is positioned inside at least part of said expandable media, with said expandable media thereby being forced to expand radially outwardly to grip an inside portion of said part when said draw bar assembly is in its second position.

3. The apparatus of claim 1 wherein said draw bar assembly includes a draw bar and an expander removably coupled to said draw bar, said expander having a configuration which corresponds to the size and shape of the gripping surface of the part and which allows said expandable media to change between said uncompressed state and said radially expanded state.

4. The apparatus of claim 3 wherein the draw bar assembly further includes an adjustable pressure air cylinder having a reciprocal piston selectively driven therein to reciprocally move the draw bar assembly between its first and second axial positions.

5. The apparatus of claim 3 wherein the draw bar assembly further includes a hollow drive shaft, which slidably receives the draw bar, and a stop collar secured thereto to receive at least part of said expander to thereby limit the range of axial movement of the draw bar, the expansion media being positioned between confronting portions of said expander and stop collar.

6. The apparatus of claim 5 wherein the stop collar has a configuration which corresponds to the size and shape of the gripping surface of the part and which allows said expandable media to change between said uncompressed state and said radially expanded state.

7. The apparatus of claim 6 wherein the stop collar has an elongated sidewall to form a stop cup for an application in which a part is gripped on its outer diameter.

8. The apparatus of claim 1 or claim 6 wherein the expansion media is at least one O-ring.

9. The assembly of claim 6 wherein the expansion media is flexible tubing.

10. The apparatus of claim 1 further including a metering valve to apply material onto at least one surface of said part.

11. The apparatus of claim 10 wherein the draw bar assembly is oriented horizontally and the metering valve is selectively applying sealant to horizontally oriented threads on said part.

12. The apparatus of claim 11 wherein said metering valve is selectively positionable and the draw bar assembly includes an expander having a selectively variable configuration, whereby parts of different shapes having threads in different positions can have sealant applied thereto by readily adapting the same apparatus to different uses.

13. The apparatus of claim 12 further including a reservoir of sealant for selectively supplying sealant to the metering valve.

14. The apparatus of claim 11 further including an adjustable wiper selectively tangentially engaging the threads away from a point of sealant application to distribute excess sealant on the threads and to spread the distributed sealant uniformly across and in the threads.

15. An apparatus for gripping and selectively rotating a part comprising:
- a drive shaft assembly selectively rotatably driven by a motor;
- a draw bar assembly generally coaxial with and selectively axially movable relative to the drive shaft assembly; and
- an expandable media positioned between part of the drive shaft assembly and part of the draw bar assembly;
- the draw bar assembly having (i) a first axial position in which the expandable media is in its uncompressed state and (ii) a second axial position in which the expandable media is compressed between said part of the drive shaft assembly and said part of the draw bar assembly to a radially expanded state for gripping the part and for rotatably coupling the drive shaft assembly to the draw bar assembly to selectively rotatably drive the gripped part when the motor is operated; and
- wherein a retainer is positioned around at least part of said expandable media, with said expandable media thereby being forced to expand radially inwardly to grip an exterior portion of said part when said draw bar assembly is in its second position.

16. A method for selectively gripping and rotating a part comprising the steps of:
- positioning an expandable media between portions of a drive shaft assembly and a draw bar assembly;
- placing a section of the part in radial alignment with the expandable media;
- moving the draw bar assembly relative to the drive shaft assembly to compress the expandable media positioned therebetween to couple the draw bar assembly to the drive shaft assembly and to grip the section of the part; and
- rotating the drive shaft assembly to rotate the draw bar assembly, compressed expandable media and gripped part.

17. An apparatus for gripping and selectively rotating a part comprising:
- a drive shaft assembly selectively rotatably driven by a motor;
- a draw bar assembly generally coaxial with an selectively axially movable relative to the drive shaft assembly; and
- an expandable media positioned between part of the drive shaft assembly and part of the draw bar assembly;
- the draw bar assembly having (i) a first axial position in which the expandable media is in its uncompressed state and (ii) a second axial position in which the expandable media is compressed between said part of the drive shaft assembly and said part of the draw bar assembly to a radially expanded state for gripping the part and for rotatably coupling the drive shaft assembly to the draw bar assembly to selectively rotatably drive the gripped part when the motor is operated; and
- wherein the expansion media is flexible tubing.

* * * * *